US010581925B2

(12) United States Patent
Whynot et al.

(10) Patent No.: US 10,581,925 B2
(45) Date of Patent: Mar. 3, 2020

(54) SESSION DESCRIPTION PROTOCOL TEMPLATE MODIFIERS FOR FLEXIBLE CONTROL OF MEDIA SERVER RESOURCES

(71) Applicant: Avaya Inc., Santa Clara, CA (US)

(72) Inventors: Stephen R. Whynot, Allen, TX (US); Trey Ballard, Dallas, TX (US)

(73) Assignee: Avaya Inc., Santa Clara, CA (US)

(*) Notice: Subject to any disclaimer, the term of this patent is extended or adjusted under 35 U.S.C. 154(b) by 312 days.

(21) Appl. No.: 14/792,200

(22) Filed: Jul. 6, 2015

(65) Prior Publication Data
US 2017/0013084 A1  Jan. 12, 2017

(51) Int. Cl.
H04L 29/06  (2006.01)
(52) U.S. Cl.
CPC .................... *H04L 65/10* (2013.01)
(58) Field of Classification Search
CPC ............... H04L 67/327; H04L 67/141; H04L 65/1006; H04L 65/1016; H04L 29/06047; H04L 61/3085; H04W 76/20; H04W 80/10
USPC ........................................................ 709/228
See application file for complete search history.

(56) References Cited

U.S. PATENT DOCUMENTS

| | | | |
|---|---|---|---|
| 2003/0145054 A1* | 7/2003 | Dyke | H04L 29/06 709/205 |
| 2005/0160152 A1* | 7/2005 | Selin | H04L 29/06027 709/217 |
| 2005/0262187 A1* | 11/2005 | Klemets | H04L 29/06027 709/203 |
| 2007/0217430 A1* | 9/2007 | Baird | H04L 65/1069 370/395.52 |
| 2008/0089324 A1* | 4/2008 | Polk | H04L 65/608 370/389 |
| 2008/0159276 A1* | 7/2008 | Kuusinen | B01J 19/0093 370/356 |
| 2010/0009674 A1* | 1/2010 | Sapkota | H04W 36/36 455/426.1 |
| 2011/0106958 A1* | 5/2011 | Thompson | H04W 4/00 709/230 |
| 2011/0270993 A1* | 11/2011 | Singh | H04L 65/40 709/227 |

(Continued)

OTHER PUBLICATIONS

Johnston and Sparks. "Session Description Protocol (SDP) Offer/Answer Examples," Network Working Group, RFC 4317, Dec. 2005, 25 pages.*

(Continued)

Primary Examiner — Hamza N Algibhah
Assistant Examiner — James Ross Hollister
(74) Attorney, Agent, or Firm — Sheridan Ross P.C.

(57) ABSTRACT

A concept of Session Description Protocol (SDP) templates and a concept of template modifiers for precise control of media types, codecs and attributes offered by a media server are described along with various methods and mechanisms for administering the same. Applications can solicit offers from media servers that precisely meet the requirements of each session, using one or more media control protocols. The media control protocols may enable applications to reserve media resources, invoke specific functions, respond to events during session initiation, and provide session modification.

19 Claims, 5 Drawing Sheets

(56) References Cited

U.S. PATENT DOCUMENTS

| | | | | |
|---|---|---|---|---|
| 2013/0227149 A1* | 8/2013 | Athlur | ............... | H04L 67/14 |
| | | | | 709/227 |
| 2014/0095576 A1* | 4/2014 | Edamadaka | ......... | H04L 67/104 |
| | | | | 709/202 |
| 2014/0223452 A1* | 8/2014 | Santhanam | ............ | G06F 9/541 |
| | | | | 719/328 |
| 2015/0304379 A1* | 10/2015 | Ezell | ..................... | H04L 67/02 |
| | | | | 709/219 |

OTHER PUBLICATIONS

Burger et al. "Basic Network Media Services with SIP," Network Working Group, RFC 4240, Dec. 2005, 24 pages.*

Burger et al. "Basic Network Media Services with SIP," Network Working Group, RFC 4240, Dec. 2005, 24 pages (Year: 2005).*

Johnston and Sparks. "Session Description Protocol (SDP) Offer/Answer Examples," Network Working Group, RFC 4317, Dec. 2005, 25 pages (Year: 2005).*

Camarillo et al. "Re-INVITE and Target-Refresh Request Handling in the Session Initiation Protocol (SIP)," Internet Engineering Task Force (IETF), RFC 6141, Mar. 2011, 26 pages (Year: 2011).*

Johnston et al. "Session Description Protocol (SDP) Offer/Answer Examples," Network Working Group, RFC 4317, Dec. 2005, 25 pages.

Rosenberg et al. "An Offer/Answer Model with the Session Description Protocol (SDP)," Network Working Group, RFC 3264, Jun. 2002, 26 pages.

* cited by examiner

| Modifier | Description | Applicability |
|---|---|---|
| audio | Use audio m-line specified | Offer |
| video | Use video m-line(s) as specified | Offer |
| audef | Use audio codecs supplied, but add digit relay, comfort noise, directional attributes, per configuration. If ptime is present its value will be used | Offer |
| videf | Use video codecs and m-lines supplied, but add defaults like AVPF parameters per configuration | Offer |
| asmeb | Generate an offer with best effort audio SRTP | Offer |
| asmen | Generate an offer with no audio SRTP | Offer |
| asmef | Generate an offer with security enforced audio SRTP | Offer |
| vsmeb | Generate an offer with best effort video SRTP | Offer |
| vsmen | Generate an offer with no video SRTP | Offer |
| vsmef | Generate an offer with security enforced video SRTP | Offer |
| wbrtc | Generate a webrtc friendly offer | Offer |
| drpyl | Use the RFC2833/4733 payload provided | Offer/Answer |
| asrmk | Use the exact SRTP master key provided for audio | Offer |

FIG. 4

SESSION DESCRIPTION PROTOCOL TEMPLATE MODIFIERS FOR FLEXIBLE CONTROL OF MEDIA SERVER RESOURCES

FIELD OF THE DISCLOSURE

The present disclosure is generally directed toward unified communications and more specifically toward providing templates with modifiers that allow a media server to build and provide customized offers for applications.

BACKGROUND

Session Description Protocol (SDP) is intended to describe multimedia sessions for a variety of purposes. The SIP protocol utilizes SDP in an offer/answer model to negotiate a media session between SIP endpoints. The offer/answer model requires a first endpoint to generate an offer describing desired resources and codecs, and a second endpoint to generate an answer that corresponds to the offer. The first endpoint generates the contents of an offer based on configuration and user input. For example, an end user may press a video call button, resulting in the first endpoint generating an offer containing audio and video capabilities. The codecs offered may be configured by the end user or an administrator.

If an endpoint is an application server, the application server may involve a media server to handle media processing. A SIP media server might receive an offer to set up a new SIP session from the first endpoint. The media server may generate an answer based on a local configuration. In another scenario, a new SIP session may require an offer from the media server, in which case an offer must be solicited from the media server. New Session Initiation Protocol (SIP) sessions may be created using a method known as a slow start SIP request. The slow start SIP request can be problematic, suffering from drawbacks including retransmissions due to delayed SIP Acknowledgements (ACKs) and timeouts. The slow start SIP request relies on the local configuration to generate the offer. Representing every possible media type and scenario through the local configuration is also unrealistic and inefficient.

An alternative method for creating new sessions with an SDP offer from the media server is a SIP Out-of-Dialog REFER (OOD-R) request when applications want to affect what media types are offered and negotiated. However, media types may not be added to an existing offer by manipulating the SDP in the network since a creator of an offer may be unaware of additional media types and/or payloads and parameters. An inability to add media types can limit flexibility within existing sessions. A lack of flexibility is also limiting when multiple applications use the same media server instance. No single configuration will satisfy all application requirements. Building intelligence into the media server per application by embedding service logic violates rules of separation of application logic, signaling, and a media plane.

SUMMARY

These and other needs are addressed by the various aspects, embodiments, and configurations of the present disclosure. The present disclosure is directed to a mechanism and an apparatus that allow applications to describe exactly what media resources and features the applications require a media server to offer for a session. The mechanism and the apparatus must be compatible with standards-based signaling and media control protocols.

The mechanism and the apparatus provide SDP templates with modifiers that allow a media server or other communication element to build and provide customized offers and answers for applications under the control of applications and provide a way for applications to influence the type of media that a media server offers and answers. Media servers can be controlled by applications using one or more media control protocols. The media control protocols can enable applications to reserve media resources, invoke specific functions, and respond to events. Successful media control protocols may follow a standard model where the application and the media server may be separate and distinct elements.

A dialog generally refers to a SIP relationship where messages may be exchanged between endpoints, SIP servers, and other SIP elements. Typically, the application server can manage endpoint dialogs and media server dialogs separately. The application may use SIP to negotiate the SIP media session between the endpoint and the media server. A separate SIP media control channel may be used between the application and the media server to issue Media Server Markup Language (MSML) commands. The SIP media control channel may not be directly associated with a SIP endpoint dialog and can be used to control multiple SIP endpoints, provided each has an established separate dialog with the media server.

To achieve granular control, SIP requests can include a modifier which is described using SDP attributes. Applications can build an example SDP offer as a template. The word template is used to describe the attached SDP since the media server can use the SDP template as a guide to create a specific offer the application may require. The template can include one or more modifiers to tell the media server what media types an application wants. Modifiers may tell the media server what to pay attention to in the template SDP and how to process the SDP. Modifiers can also be used to simplify generating template SDP by allowing applications to reuse SDP received from an endpoint. The media server can use the SDP template to build an offer specific to the application. The mechanism and apparatus can use an SDP template attached to an OOD-R message, an INVITE message, an INFO message, a RESTful HTTP request, or other request type. Media descriptions and attributes in the SDP template can be used to build customized, valid offers for applications as needed.

In a non-limiting example, a SIP communication system is operable to use an SDP template using an OOD-REFER SIP message to tell a media server to generate an INVITE message that includes codecs G.722 and G.729, in that order, with secure RTP, and with Transport Independent Application Specific Maximum (TIAS) values of X. An SDP template is attached to the OOD-REFER message sent to the media server, and the resulting SDP offer created by the media server is attached to an INVITE sent outbound towards the originating SIP communication system. In an INFO message example, the media server uses the attached template SDP in the INFO message to RE-INVITE with the resulting offer within an existing session. The SDP template attached to any message type must be well formed. Origin, session information, Internet Protocol (IP), and ports can be ignored by the media server but are required for the SDP template to be well formed.

In some embodiments, a method is provided that generally comprises:

determining one or more communication attributes desired for an application;

generating a Session Description Protocol (SDP) template that includes a definition of the one or more communication attributes desired for the application;

attaching the SDP template to at least one message; and transmitting the at least one message with the SDP template attached thereto to a server configured to participate in a communication session in which the application is to be involved such that the server can determine and attempt to provide the one or more communication attributes for the application during the communication session.

The term "automatic" and variations thereof, as used herein, refers to any process or operation done without material human input when the process or operation is performed. However, a process or operation can be automatic, even though performance of the process or operation uses material or immaterial human input, if input is received before performance of the process or operation. Human input is deemed to be material if such input influences how the process or operation will be performed. Human input that consents to the performance of the process or operation is not deemed to be "material."

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The term "customer" or "client" denotes a party patronizing, serviced by, or otherwise doing business with a contact center, business, or enterprise.

The terms "determine," "calculate," and "compute," and variations thereof as used herein, are used interchangeably and include any type of methodology, process, mathematical operation or technique.

The term "template" as used herein denotes the use of information in a pattern or format to guide a media server in offer creation.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 4 is a table for modifiers for the Session Description Protocol templates in accordance with embodiments of the present disclosure.

DETAILED DESCRIPTION

Figure 1:
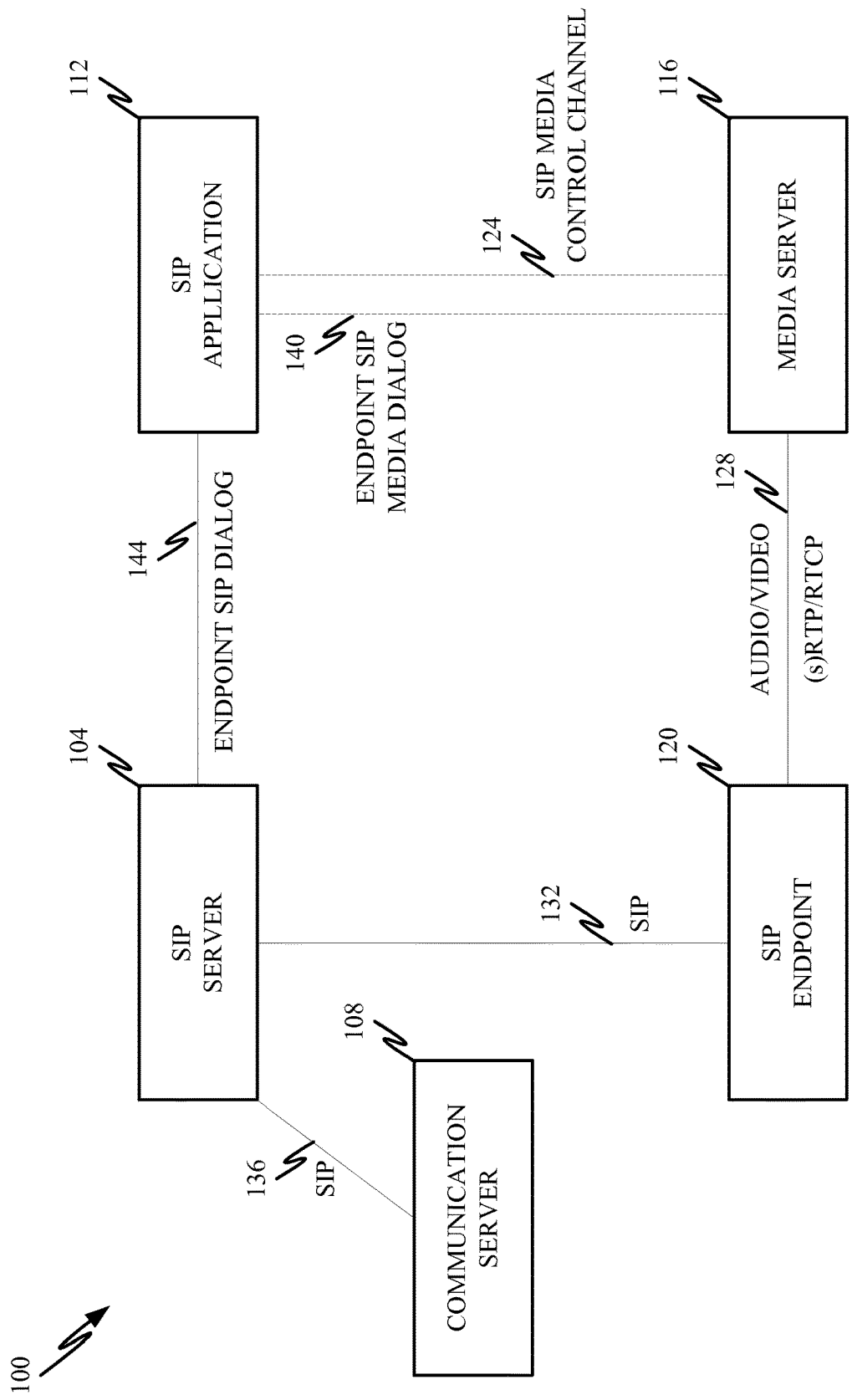
FIG. 1 is a block diagram of a communication system in accordance with embodiments of the present disclosure.

FIG. 1 depicts a communication system 100 in accordance with at least some embodiments of the present disclosure. The communication system 100 may be a distributed system and, in some embodiments, comprises one or more Session Initiation Protocol (SIP) endpoints 120 connected to a SIP server 104, a communication server 108, a SIP application 112, and a SIP media server 116, which may be owned and operated by an enterprise in which a plurality of SIP applications 112 are operable to provide services to users with SIP endpoints 120.

The SIP endpoints 120 may correspond to customer communication devices. In accordance with at least some embodiments of the present disclosure, a user may utilize the SIP endpoint 120 to request a service from a SIP application 112. The request may include, but is not limited to, a contact directed toward and received at an enterprise, a SIP message request directed toward and received at a server farm (e.g., collection of servers), a media request, an application request (e.g., a request for application resources location on a remote application server, such as a SIP application server), and the like. The format of the request may depend upon the capabilities of the SIP endpoint 120. The communication may be received and processed by the SIP server 104, the communication server 108, the media server 116, or a combination of any of these and the like.

In accordance with at least some embodiments of the present disclosure, the SIP endpoints 120 may comprise any type of known communication equipment or collection of communication equipment. Examples of a suitable SIP endpoint 120 include, but are not limited to, a personal computer, laptop, tablet, cellular phone, smartphone, application, telephone, or combinations thereof. In general, each SIP endpoint 120 may be adapted to support video, audio, text, and/or data communications with other SIP endpoints 120 as well as with the SIP applications 112. The type of medium used by the SIP endpoint 120 to communicate with other SIP endpoints 120 or SIP applications 112 may depend upon the communication applications available on the SIP endpoint 120.

In accordance with at least some embodiments of the present disclosure, a SIP dialog 144 for an endpoint 120 may be created for communication between the SIP server 104 and the SIP application 112. An endpoint SIP media dialog 140 may be created for communication between the SIP application 112 and the SIP media server 116. A SIP media control channel 124 may be created for sharing control messages between the SIP application 112 and the SIP media server 116. An audio or audio/video channel 128 using Secure Real Time Transfer Protocol/Real-time Transport Control Protocol (SRTP/RTCP) may be established to provide data and instructions for the data passed between the SIP endpoint 120 and the SIP media server 116. A SIP channel 132 for communication may be created between the SIP server 104 and the SIP endpoint 120 as well as a SIP channel 136 between the SIP server 104 and the communication server 108. The communication dialogs and channels depicted are representative only, and more or less dialogs, channels, sessions, and other communications may exist between elements.

As discussed above, the SIP server 104, the communication server 108, the SIP application 112, the SIP media server 116, and the SIP endpoint 120 may be owned and operated by a common entity in an enterprise format. In some embodiments, the SIP server 104, the communication server 108, the SIP application 112, the SIP media server 116, and the SIP endpoint 120 may be administered by multiple enterprises, users, and customers, each of which may have its own dedicated resources.

A SIP server 104 is operable to utilize a SIP-based architecture to unify media, networks, modes, devices, applications and provide presence across a common infrastructure. The SIP server 104 may communicate with the communication server 108, the SIP application 112, the SIP media server 116, SIP endpoints 120, and other network elements in and connected to the communication system 100.

A communication server 108 may comprise software and hardware operable to provide voice and video capabilities, failover capabilities, monitoring, and management. The communication server 108 can provide voice and video call processing capabilities, advanced workforce productivity and mobility features, conferencing and contact center applications, centralized voicemail and attendant operations within a single and across multiple enterprise locations, support for SIP, H.323, and other industry-standard communications protocols over a variety of different networks, and hundreds of communication features. The communication server 108 may communicate with the SIP server 104, the SIP application 112, the SIP media server 116, SIP endpoints 120, and other network elements in and connected to the communication system 100.

A SIP media server 116 is operable to provide call support, including routing, transfers, and bridging, RE-INVITE, REFER, and other SIP message support, act as a registrar server and/or a proxy server, and provide authentication support and NAT translation. The SIP media server 116 may communicate with the SIP server 104, the communication server 108, the SIP application 112, SIP endpoints 120, and other network elements in and connected to the communication system 100.

Figure 2:
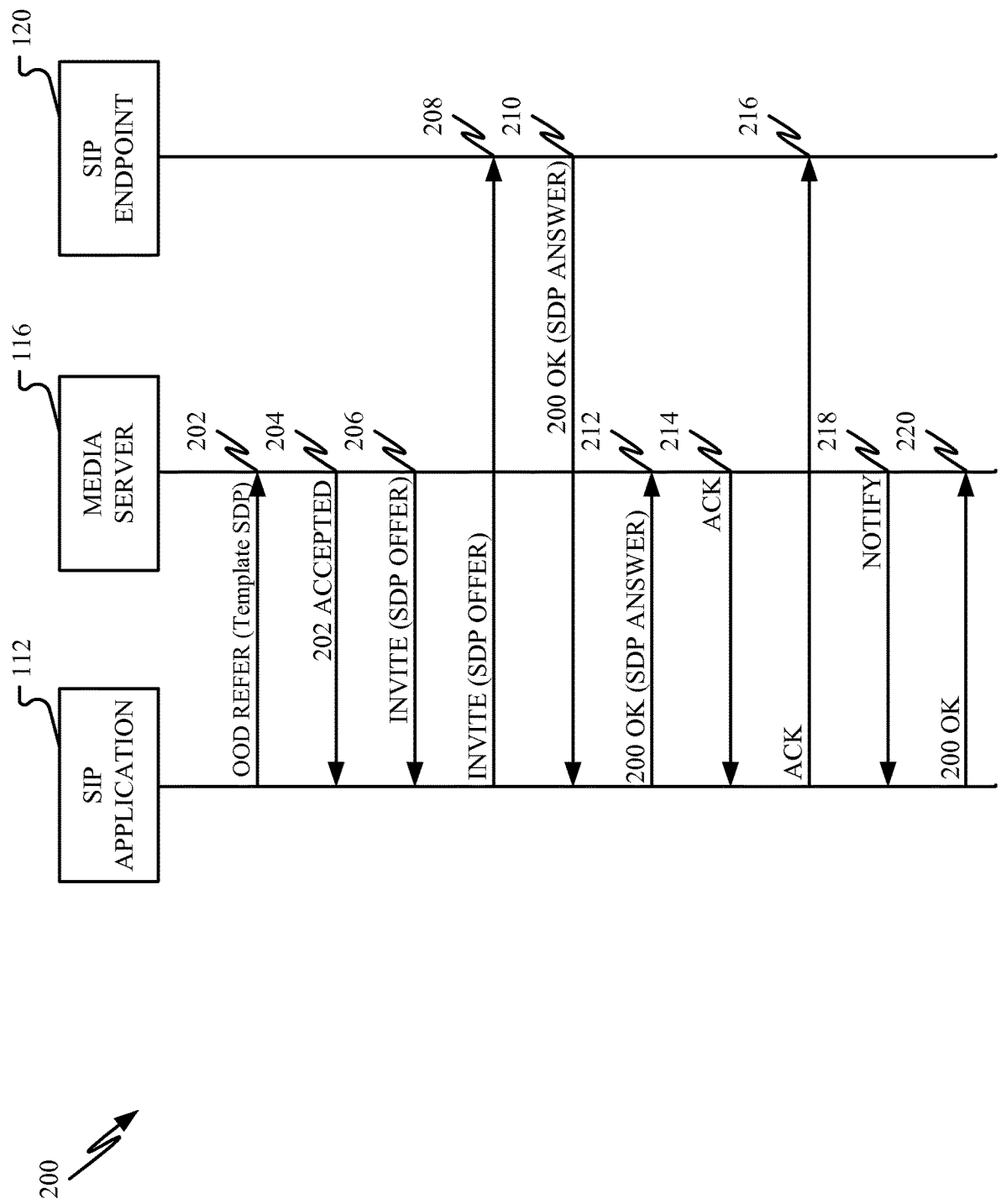
FIG. 2 is a ladder sequence diagram of an embodiment of logical relationships in a call flow 200 within SIP that includes media applications, servers, and endpoints in accordance with embodiments of the present disclosure.

FIG. 2 is a ladder sequence diagram of an embodiment of logical relationships in a call flow 200 within SIP that includes media applications, servers, and endpoints. The call flow 200 can be executed as a set of computer-executable instructions executed by a computer system and encoded or stored on a computer readable medium. Hereinafter, the call flow 200 shall be explained with reference to the systems, components, modules, elements, software, structures, etc. described in conjunction with FIG. 1.

The following call flow 200 can be useful for initiating an outbound call to a SIP endpoint without using slow start SIP. A SIP application 112 can for example, omit video from a media server 116 offer by omitting a video modifier from an SDP template.

The SIP application 112 can send an Out-Of-Dialog REFER (OOD-R) SIP message to provide SDP information to the media server 116 in the SDP template that may contain desired media descriptions and attributes in step 202. For example, the SDP template may provide modifiers for audio, security, and codec use but omit video from the SDP template. The media server 116 may send a SIP 202 Accepted message in step 204. The SIP 202 Accepted message of step 204 indicates that the request has been accepted for processing, but the processing has not yet been completed. In step 206, the media server 116 may create an SDP offer using the desired media descriptions and attributes in the SDP template as a guide to include audio, security, and codec use information. In step 206, the media server 116 may send a SIP INVITE message that contains the offer. The SIP application 112 receives the SIP INVITE message and in turn may send a SIP INVITE message containing the SDP offer to a SIP endpoint 120, in step 208. The SIP endpoint 120 in step 210 may return a SIP 200 OK message which provides an SDP answer to the SIP application 112 and indicates that the request was successful. In step 212, the SIP application 112 may return a SIP 200 OK message which provides the SDP answer to the media server 116 and indicates that the request was successful. The media server 116 may return a SIP Acknowledgment (ACK) message to the SIP application 112, in step 214. The SIP application 112 in turn may return a SIP ACK message to the SIP endpoint 120, in step 216. In step 218, the media server 116 may send a SIP NOTIFY message to the SIP application 112 to notify the subscribing SIP application 112 of a new event, namely an SDP answer acceptance. The SIP application 112 may return a SIP 200 OK message in step 220 to the media server 116 indicating that the SDP template offer/SDP answer exchange has been completed.

Figure 3:
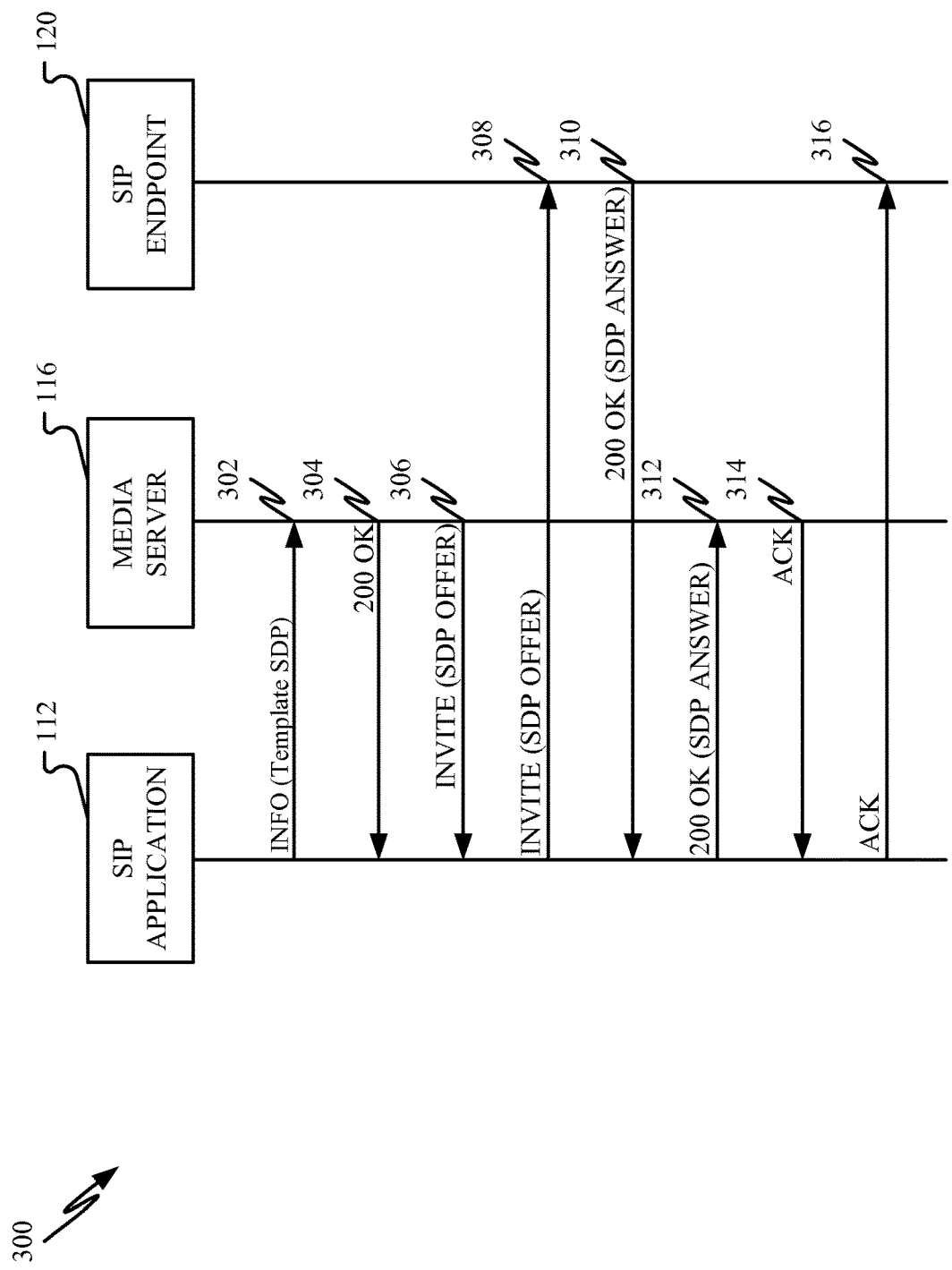
FIG. 3 is a ladder sequence diagram of an embodiment of logical relationships in a call flow 300 within SIP that includes media applications, servers, and endpoints in accordance with embodiments of the present disclosure.

FIG. 3 is a ladder sequence diagram of an embodiment of logical relationships in a call flow 300 within SIP that includes media applications, servers, and endpoints. The call flow 300 can be executed as a set of computer-executable instructions executed by a computer system and encoded or stored on a computer readable medium. Hereinafter, the call flow 300 shall be explained with reference to the systems, components, modules, elements, software, structures, etc. described in conjunction with FIGS. 1-2.

The following call flow 300 can be useful for initiating a change in media, such as a SIP endpoint 120 requesting to add video to an established SIP session where video was omitted during setup. A SIP INFO message is used to carry an SDP template (rather than an OOD-R message as in FIG. 2) since the SIP session is already in progress.

A SIP application 112 can send the SIP INFO message that contains desired media descriptions and attributes including video in an SDP template for a RE-INVITE, in step 302. In step 304, a media server 116 may return a SIP 200 OK message to the SIP application 112 indicating that the request has been accepted for processing, but the processing has not been completed. In step 306, the media server 116 may create an SDP offer that includes existing and additional modifiers for video from the SDP template and send a newly created SIP INVITE (RE-INVITE) message to the SIP application 112. In step 308, the SIP application 112 may send a SIP INVITE (RE-INVITE) with the SDP offer to the SIP endpoint 120 within the existing dialog. In step 310, the SIP endpoint 120 may return a SIP 200 OK message which provides an SDP answer to the SIP application 112 and indicates that the request was successful. In step 312, the SIP application 112 may send a SIP 200 OK message to the media server 116 containing the SDP answer. A SIP ACK message may be returned by the media server 116 in step 314 to the SIP application 112 to acknowledge receipt of the SDP answer. In step 316, the SIP application 112 may send a SIP ACK message to the SIP endpoint 120 to let the SIP endpoint 120 know that the SDP template offer/SDP answer exchange has been completed and video service may now be available.

FIG. 4 is a table for modifiers for the Session Description Protocol (SDP) templates 400. FIG. 4 contains a first column Modifier 404, a second column Description 408, and a third column Applicability 412. One or more modifiers may be used in SIP messages containing the SDP template. Order of the modifiers is not relevant to processing, and modifiers may apply to offer and/or answer processing as noted in the Applicability 412 column. If modifiers are present that apply to answer processing, an attribute present in the offer with the appropriate answer modifier may be included. The answer modifier may only be applicable to media server 116 interconnections operable to process a custom attribute.

The media server 116 will not process unsupported SDP modifiers. The media server 116 will ignore IP addresses and ports in a template in most cases. One exception may be when m-lines with a 0 port have significance. The media server 116 may discard attributes that are not understood and/or not supported. Elements highlighted by italics are non-limiting examples of attributes as template modifiers.

In row 414, a template Modifier 404 audio may include attributes for audio with a Description 408 Use audio m-line specified, with Applicability 412 for an Offer where each media-level section starts with an "m=" line and continues to the next media-level section or the end of the whole session description. The audio modifier can allow for granular control over audio codecs offered, codec order, telephone-events, bandwidth, sourceid, ptime, activetalker, and directional attributes. An example of the scope of control is highlighted below. IP addresses and version, ports, Real-time Transport Protocol (RTP) profile, Secure Real-time Transport Protocol (SRTP), and payload types are not under the control of the SIP application 112. If sourceid is present, the sourceid value will be used for a session.

```
v=0
o=- 1336510428 1 IN IP4 135.60.87.77
s=-
c=IN IP4 135.60.67.47
b=TIAS:15360000
t=0 0
a=templatectrlv1:audio
m=audio 5004 RTP/AVP 9 0 8 13 18 110 120
b=TIAS:82000
a=rtpmap:9 G722/8000
a=rtpmap:0 PCMU/8000
a=rtpmap:8 PCMA/8000
a=rtpmap:13 CN/8000
a=rtpmap:18 G729/8000
a=fmtp:18 annexb=no
a=rtpmap:110 G726-32/8000
a=rtpmap:120 telephone-event/8000
a=ptime:20
a=sendrecv
a=tcap:1 RTP/SAVP
a=acap:1    crypto:1    AES_CM_128_HMAC_SHA1_80 inline:c0F2OINXWIHxJrYT8NLRP/mjXaqndKwLluq+v07G
a= pcfg:1 t=1 a=1
```

In row 416, a template Modifier 404 video may include attributes for video with a Description 408 Use audio m-line(s) as specified, with Applicability 412 for an Offer. The video modifier can allow for granular control over video capabilities offered, including codec types and order, bandwidth, directional stream attributes, packetization mode, sprop, RTP Control Protocol (RTCP) feedback, framerate, and window mapping. H.264AVC, H.264SVC, and other video codecs can be supported.

```
v=0
o=- 1360954146 1 IN IP4 135.60.87.104
s=-
e=unknown@invalid.net
c=IN IP4 10.130.107.85
b=TIAS:13952000
t=0 0
a=avf:avc=y prio=n
a=csup:avf-v0
a=templatectrlv1:video
m=audio 5010 RTP/AVP 103 9 8 0 102 18 120
a=rtpmap:103 ISAC/16000
a=rtpmap:9 G722/8000
a=rtpmap:8 PCMA/8000
a=rtpmap:0 PCMU/8000
a=rtpmap:102 ILBC/8000
a=fmtp:102 mode=20
a=rtpmap:18 G729/8000
a=fmtp:18 annexb=yes
a=rtpmap:120 telephone-event/8000
m=video 5030 RTP/AVP 118
b=TIAS:1536000
b=AS:1680
a=rtpmap:118 H264-SVC/90000
a=fmtp:118 sprop-operation-point-info=<1,0,0,0,42E00D,7680,320,180,128,128>,<2,0,1,0,53001E,7680,640,360,512,512>,<3,0,2,0,53001F,7680,1280,720,1536,1536>;profile-level-id=53001f;packetization-mode=1
a=rtcp-fb:* nack pli
a=rtcp-fb:* ccm fir
a=framerate:30.0
```

In row 418, a template Modifier 404 audef may include attributes for audio codecs with a Description 408 Use audio codecs supplied, but add digit relay, comfort noise, directional attributes, per configuration. If ptime is present its value will be used as specified, with Applicability 412 for an Offer. The audef modifier can provide simplified control over what audio codecs are offered and in what order, activetalker, sourceid, directional, and ptime. If ptime is absent, a default of 20 ms will be used. A telephone-event is added per configuration on the media server 116 (audio modifier for control over telephone-event), an RTP profile is not set, and if the sourceid is present, the sourceid value can be used for the session. INFO template requests (without audio or audef) and slow start SIP re-invites typically result in the specified codec list being reoffered, since the order of codecs is stored by the media server 116 and remains for the duration of the session or until a template request causes a change.

```
v=0
o=- 1336510428 1 IN IP4 135.60.87.77
s=-
c=IN IP4 135.60.67.47
b=TIAS:15360000
t=0 0
a=activetalker
a=sourceid:153762892
a=templatectrlv1:audef
m=audio 5004 RTP/AVP 9 0 8 13 18 110 120
b=TIAS:82000
a=rtpmap:9 G722/8000
a=rtpmap:0 PCMU/8000
a=rtpmap:8 PCMA/8000
a=rtpmap:13 CN/8000
a=rtpmap:18 G729/8000
a=fmtp:18 annexb=no
a=rtpmap:110 G726-32/8000
a=rtpmap:120 telephone-event/8000
a=ptime:20
a=sendrecv
a=tcap:1 RTP/SAVP
a=acap:1 crypto:1 AES_CM_128_HMAC_SHA1_80
   inline:c0F2OINXWIHxJrYT8NLRP/mjXaqndKwLluq+v07G
a=pcfg:1 t=1 a=1
```

In row 420, a template Modifier 404 videf may include attributes for video codecs and m-lines with a Description 408 Use video codecs and m-lines supplied, but add defaults like audio-visual early feedback profile (AVPF) parameters per configuration as specified, with Applicability 412 for an Offer. The videf modifier can provide simplified control over video capabilities offered, including codec types and order, bandwidth, directional stream attributes, sprop, framerate, and window mapping. Only H.264AVC and H.264SVC codecs can be supported. The videf modifier may allow applications to control the number of video streams, codecs, profile levels, and parameters offered. Details to transport the stream reliably may be added by the media server 116.

```
v=0
o=- 1360954146 1 IN IP4 135.60.87.104
s=-
e=unknown@invalid.net
c=IN IP4 10.130.107.85
b=TIAS:13952000
t=0 0
a=avf:avc=y prio=n
a=csup:avf-v0
a=activetalker
a=templatectrlv1:videf
m=audio 5010 RTP/AVP 103 9 8 0 102 18 120
a=rtpmap:103 ISAC/16000
a=rtpmap:9 G722/8000
```

-continued

```
a=rtpmap:8 PCMA/8000
a=rtpmap:0 PCMU/8000
a=rtpmap:102 ILBC/8000
a=fmtp:102 mode=20
a=rtpmap:18 G729/8000
a=fmtp:18 annexb=yes
a=rtpmap:120 telephone-event/8000
m=video 5030 RTP/AVP 118
b=TIAS:1536000
b=AS:1680
a=rtpmap:118 H264-SVC/90000
a=fmtp:118 sprop-operation-point-
info=<1,0,0,0,42E00D,7680,320,180,128,128>,<2,0,1,0,53001E,7680,
640,360,512,512>,<3,0,2,0,53001F,7680,1280,720,1536,1536>;profile-
level-id=53001f;packetization-mode=1
a=content:window1,1,100,1
a=rtcp-fb:* nack pli
a=rtcp-fb:* ccm fir
a=framerate:30.0
m=video 5032 RTP/AVP 118
b=TIAS:512000
b=AS:560
a=recvonly
a=rtpmap:118 H264-SVC/90000
a=fmtp:118 sprop-operation-point-
info=<1,0,0,0,42E00D,7680,320,180,128,128>,<2,0,1,0,53001E,7680,
640,360,512,512>;profile-level-id=53001f;packetization-
mode=1
a=content:window2,1,100,1
a=rtcp-fb:* nack pli
a=rtcp-fb:* ccm fir
a=framerate:30.0
m=video 5034 RTP/AVP 118
b=TIAS:512000
b=AS:560
a=recvonly
a=rtpmap:118 H264-SVC/90000
a=fmtp:118 sprop-operation-point-
info=<1,0,0,0,42E00D,7680,320,180,128,128>,<2,0,1,0,53001E,7680,
640,360,512,512>;profile-level-id=53001f;packetization-
mode=1
a=content:window3,1,100,1
a=rtcp-fb:* nack pli
a=rtcp-fb:* ccm fir
a=framerate:30.0
m=video 5036 RTP/AVP 118
b=TIAS:512000
b=AS:560
a=recvonly
a=rtpmap:118 H264-SVC/90000
a=fmtp:118 sprop-operation-point-
info=<1,0,0,0,42E00D,7680,320,180,128,128>,<2,0,1,0,53001E,7680,
640,360,512,512>;profile-level-id=53001f;packetization-
mode=1
a=content:window4,1,100,1
a=rtcp-fb:* nack pli
a=rtcp-fb:* ccm fir
a=framerate:30.0
```

In row 422, a template Modifier 404 asmeb may include attributes for SRTP with a Description 408 Generate an offer with best effort audio SRTP, with Applicability 412 for an Offer. The asmeb modifier may instruct the media server 116 to overlay best effort audio SRTP using capabilities negotiation (cap-neg) on the resulting generated offer. The asmeb modifier does not require SRTP attributes (e.g., cap-neg and crypto lines) in the SDP template. The media server 116 can generate a best effort offer based on local configuration settings, typically set to provide interoperability with a network.

In row 424, a template Modifier 404 asmen may omit attributes for SRTP with a Description 408 Generate an offer with no audio SRTP, with Applicability 412 for an Offer. The asmen modifier can instruct the media server 116 not to offer SRTP for audio. If the media server 116 is configured with an SRTP policy locally, it will not be offered for the session.

In row 426, a template Modifier 404 asmef may have attributes for SRTP with a Description 408 Generate an offer with security enforced audio SRTP, with Applicability 412 for an Offer. The asmef modifier can instruct the media server 116 to offer security enforced SRTP (SAVP) for audio. If the media server 116 is not configured for SRTP locally or it is configured with a best-effort policy, security enforced SRTP can be used for this session.

In row 428, a template Modifier 404 vsmeb may have attributes for SRTP with a Description 408 Generate an offer with best effort video SRTP, with Applicability 412 for an Offer. The vsmeb modifier can instruct the media server 116 to overlay best effort video SRTP using cap-neg on a generated offer. The vsmeb modifier does not require SRTP attributes (e.g., cap-neg and crypto lines) in the SDP template or video m-lines. The media server 116 can generate a best effort offer based on local configuration settings, typically set to provide interoperability with a network.

In row 430, a template Modifier 404 vsmen may omit an attribute for SRTP with a Description 408 Generate an offer with no video SRTP, with Applicability 412 for an Offer. The vsmen modifier can instruct the media server 116 not to offer SRTP for video, even when the media server 116 is configured with a local SRTP policy.

In row 432, a template Modifier 404 vsmef may have attributes for SRTP with a Description 408 Generate an offer with security enforced video SRTP, with Applicability 412 for an Offer. The vsmef modifier can instruct the media server 116 to offer security enforced SRTP for video, even if the media server 116 is not configured for SRTP locally or is configured with a best-effort policy.

In row 434, a template Modifier 404 wbrtc may have attributes for WebRTC with a Description 408 Generate a webrtc friendly offer, with Applicability 412 for an Offer. The wbrtc modifier will generate a WebRTC-friendly offer.

In row 436, a template Modifier 404 drpyl may have attributes for payload with a Description 408 Use the RFC2833/4733 payload provided, with Applicability 412 for an Offer/Answer. The drpyl modifier can instruct the media server 116 to use a telephone-event payload from the template SDP and not one assigned by the media server 116 at SDP offer generation. If the drpyl modifier is received in an offer, the drpyl modifier can instruct the media server 116 to use the same telephone-event payload received in the offer, and the payload type can be maintained for the life of the session.

In row 438, a template Modifier 404 asrmk may have attributes for master key use with a Description 408 Use the exact SRTP master key provided for audio, with Applicability 412 for an Offer. The asrmk modifier requires a crypa modifier (see row 502) to be present and can instruct the media server 116 to use a crypto master key provided in a template when best effort and/or security enforced SRTP modifiers are used with audio. The asrmk modifier must be used with a valid audio SRTP modifier (e.g., asmeb, asmef).

Any of the template SDP modifiers previously discussed can control portions of the SDP generation. When multiple modifiers are present, the intersection of the SDP portions covered by each template SDP modifier can be accounted for during template processing, allowing for more advanced control. Additional modifiers using the same method may be created and added to tables as use cases arise and protocols move in and out of use.

Figure 5:
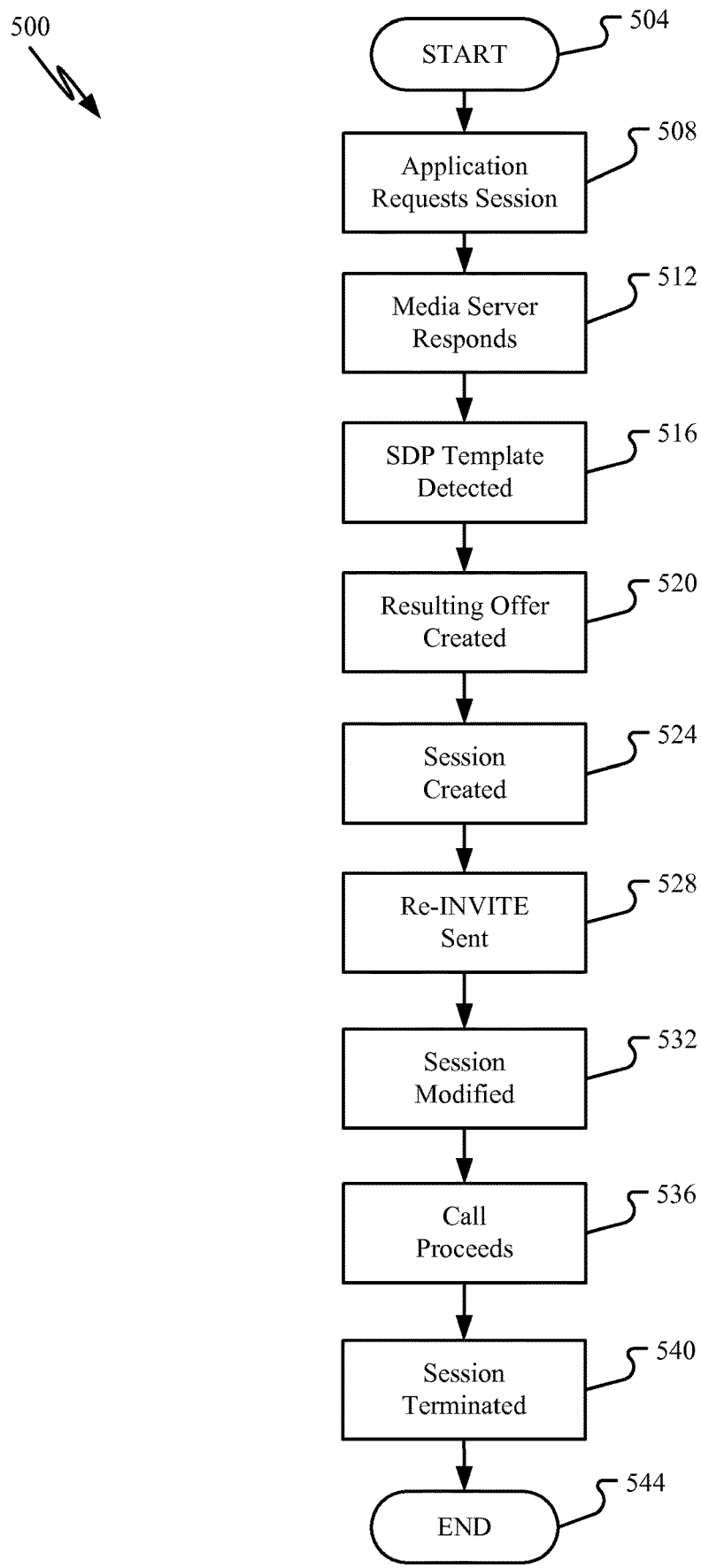
FIG. 5 is a flow diagram for a method of Session Description Protocol template modification in accordance with embodiments of the present disclosure.

FIG. 5 is a flow diagram depicting a method for Session Description Protocol template modification in accordance with an embodiment of the present disclosure. Generally, the method 500 begins with a start operation 504 and terminates with an end operation 544. While a general order for the steps of the method 500 are shown in FIG. 5, the method 500 can include more or fewer steps or the order of the steps can be arranged differently than those shown in FIG. 5. The method 500 can be executed as a set of computer-executable instructions executed by a computer system and encoded or stored on a computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 500 shall be explained with reference to the systems, components, modules, elements, software, structures, etc. described in conjunction with FIGS. 1-4.

Typically, the method begins when a SIP application 112 initiates a request for a session, in step 508. An OOD-R with an SDP template may be sent to a media server 116 by the SIP application 112. In a non-limiting example, a template may control what audio codecs are offered:

```
v=0
o=- 1336510428 1 IN IP4 135.60.87.77
s=-
c=IN IP4 135.60.67.47
b=TIAS:15360000
t=0 0
a=activetalker
a=sourceid:153762892
a=templatectrlvl:drpyl
m=audio 5004 RTP/AVP 9 0 8 13 18 110 120
b=TIAS:82000
a=rtpmap:9 G722/8000
a=rtpmap:0 PCMU/8000
a=rtpmap:8 PCMA/8000
a=rtpmap:13 CN/8000
a=rtpmap:18 G729/8000
a=fmtp:18 annexb=no
a=rtpmap:110 G726-32/8000
a=rtpmap:120 telephone-event/8000
a=ptime:20
a=sendrecv
```

```
v=0
o=- 1360166136139 0 IN IP4 192.168.11.70
s=-
c=IN IP4 192.168.11.199
t=0 0
a=templatectrlvl:audef
m=audio 14004 RTP/AVP 0 8 18 96
c=IN IP4 192.168.11.199
a=rtpmap:0 PCMU/8000
a=rtpmap:8 PCMA/8000
a=rtpmap:18 G729/8000
a=fmtp:18 annexb=yes
a=rtpmap:96 AMR/8000
a=ptime:20
a=sendrecv
m=video 0 RTP/AVP 34
c=IN IP4 192.168.11.199
a=inactive
```

In step 512, the media server 116 may respond with a 202 Accepted message. In step 516, the media server 116 may detect the SDP template previously offered. A resulting offer in a SIP INVITE message may be created by the media server 116 and sent to the SIP application 112 which in turn is sent to and answered by a SIP endpoint 120, in step 520. In a non-limiting example, an offer based on the template above omits video as no video modifiers were in the template:

```
v=0
o=AMS 1 2 IN IP4 192.168.11.122
s=-
c=IN IP4 192.168.11.122
t=0 0
m=audio 21000 RTP/AVP 0 8 18 13 96
c=IN IP4 192.168.11.122
a=rtpmap:0 PCMU/8000
a=rtpmap:8 PCMA/8000
a=rtpmap:18 G729/8000
a=fmtp:18 annexb=yes
a=rtpmap:13 CN/8000
a=rtpmap:96 telephone-event/8000
a=ptime:20
a=sendrecv
```

In step 524, a SIP session may be created for the SIP endpoint 120. During the course of the SIP session (an audio-only call) Tom, who is a user of the SIP endpoint 120, decides that he would like to add video to the SIP session. Tom initiates a video request through the SIP application 112. A new SDP template may be created that includes a video modifier (e.g., videf). A re-INVITE is sent in step 528 with a new offer from the media server 116 to the SIP application 112 and back to Tom and the SIP endpoint 120. In step 532, the SIP session may be modified, making video available to Tom. Tom initiates video from the SIP endpoint 120 and the call proceeds with audio and video capabilities, in step 536. In step 540, Tom hangs up and the session is terminated. In step 544, the method ends.

The given description and non-limiting examples may be highly simplified. In practice, use of one or more modifiers and settings in one or more server configurations can impact offers and answers in complex call and dialog change scenarios. While only two use cases (e.g., session initiation and session modification) have been described, template modifiers can be used to initiate session changes at any point in SIP communications as needed. Additionally, the session description protocol template modifiers may be used to control clients, multipoint conferencing units (MCUs), and other software and hardware elements. The SDP template modifiers described above are a subset of existing SDP template modifiers and the method allows for the addition of future modifiers as hardware, software, and protocols change and advance.

It should be appreciated that while embodiments of the present disclosure have been described in connection with typical unified communication communications architecture, embodiments of the present disclosure may apply to other types of communications systems.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

What is claimed is:

1. A method, comprising:
   determining, by a microprocessor executing a Session Initiation Protocol (SIP) application, one or more communication attributes desired for the SIP application;
   generating, by the microprocessor executing the SIP application, a Session Description Protocol (SDP) template that comprises a definition of the one or more communication attributes desired for the SIP application;
   attaching, by the microprocessor executing the SIP application, the SDP template to at least one message;
   transmitting, by the microprocessor executing the SIP application, the at least one message with the SDP template attached thereto to a media server configured to participate in a communication session in which the SIP application is to be involved such that the media server determines and attempts to provide the one or more communication attributes for the SIP application during the communication session, wherein the communication session is for establishing an audio and/or video channel between the media server and a SIP endpoint;
   receiving, by the microprocessor executing the SIP application, a response from the media server that comprises a SDP offer generated in accordance with the SDP template, forwarding the SDP offer to the SIP endpoint that is to be involved in the communication session, receiving a SDP answer from the SIP endpoint, wherein the SDP answer is generated in response to the SIP endpoint receiving the SDP offer, and using the SDP answer and SDP offer as part of negotiating communication capabilities for the communication session; and
   wherein the at least one message with the attached SDP template comprises a SIP INFO message and wherein, in response to transmitting the SIP INFO message with the SDP template, receiving a SIP RE-INVITE message with a SDP offer based on the SDP template.

2. The method of claim 1, wherein the at least one message further comprises at least one of a SIP Out Of Dialog Refer (OOD-Refer) message and a SIP INVITE message.

3. The method of claim 1, wherein the at least one message comprises at least a Hyper Text Transport Protocol (HTTP) request.

4. The method of claim 1, wherein the one or more communication attributes comprise Web Real Time communication (WebRTC) capabilities.

5. A communication system, comprising:
a microprocessor; and
a computer readable medium, coupled with the microprocessor and comprising microprocessor readable and executable instructions that cause the microprocessor to execute:
a media server that creates an offer for a communication session based on a Session Description Protocol (SDP) template received from a Session Initiation Protocol (SIP) application; and
the SIP application that influences what media types and attributes are offered by the media server;
the SIP application further determines one or more communication attributes desired for the SIP application and generates the SDP template that comprises a definition of the one or more communication attributes desired for the SIP application;
the SIP application further attaches the SDP template to at least one message and transmits the at least one message with the SDP template attached thereto to the media server that participates in the communication session in which the SIP application is to be involved such that the media server determines and attempts to provide the one or more communication attributes for the SIP application during the communication session, wherein the communication session is for establishing an audio and/or video channel between the media server and a SIP user endpoint; and
the SIP application further receives a response from the media server that comprises a SDP offer generated in accordance with the SDP template, forwards the SDP offer to the SIP endpoint that is to be involved in the communication session, receives a SDP answer from the SIP endpoint, wherein the SDP answer is generated in response to the SIP endpoint receiving the SDP offer, and uses the SDP answer and SDP offer as part of negotiating communication capabilities for the communication session; and
wherein the at least one message with the attached SDP template comprises a SIP INFO message and wherein, in response to transmitting the SIP INFO message with the SDP template, receiving a SIP RE-INVITE message with the SDP offer based on the SDP template.

6. The system of claim 5, wherein the at least one message comprises at least one of a SIP Out Of Dialog Refer (OOD-Refer) message and a SIP INVITE message.

7. The system of claim 5, wherein the at least one message comprises at least a Hyper Text Transport Protocol (HTTP) request.

8. The system of claim 5, wherein the one or more communication attributes comprise Web Real Time communication (WebRTC) capabilities.

9. The system of claim 5, wherein the at least one message with the attached SDP template comprises a Session Initiation Protocol (SIP) Out Of Dialog Refer (OOD-Refer) message.

10. The method of claim 1, wherein the at least one message with the attached SDP template comprises a Session Initiation Protocol (SIP) Out Of Dialog Refer (OOD-Refer) message.

11. The method of claim 1, wherein the at least one message with the attached SDP template comprises a SIP Out Of Dialog Refer (OOD-Refer) message and wherein, in response to transmitting the SIP OOD-Refer message with the attached SDP template, receiving a SIP INVITE message with a SDP offer based on the SDP template.

12. A method, comprising:
determining, by a microprocessor executing a Session Initiation Protocol (SIP) application, one or more communication attributes desired for the SIP application;
generating, by the microprocessor executing the SIP application, a Session Description Protocol (SDP) template that comprises a definition of the one or more communication attributes desired for the SIP application;
attaching, by the microprocessor executing the SIP application, the SDP template to at least one message, wherein the at least one message comprises at least one of a Session Initiation Protocol (SIP) INFO message, a SIP Out Of Dialog Refer (OOD-Refer) message, and a SIP INVITE message; and
transmitting, by the microprocessor executing the SIP application, the at least one message with the SDP template attached thereto to a media server configured to participate in a communication session in which the SIP application is to be involved such that the media server determines and attempts to provide the one or more communication attributes for the SIP application during the communication session, wherein the communication session is for establishing an audio and/or video channel between the media server and a SIP endpoint; and
wherein the at least one message with the attached SDP template comprises the SIP INFO message and wherein, in response to transmitting the SIP INFO message with the SDP template, receiving a SIP RE-INVITE message with a SDP offer based on the SDP template.

13. The method of claim 1, wherein the transmitted SDP template purposely omits a video modifier communication attribute in order to not slow start the communication session.

14. The method of claim 1, wherein the at least one message comprises the Session Initiation Protocol (SIP) INFO message and wherein the transmitted SDP template includes a video modifier communication attribute to add video to an existing communication session.

15. The method of claim 10, wherein the SIP OOD-Refer message starts the initiation of the communication session.

16. The method of claim 15, wherein in response to transmitting the SIP OOD-Refer message, receiving a SIP 202 Accepted message, wherein the SIP 202 Accepted message indicates that a request has been accepted for processing, but not yet completed.

17. The method of claim 1, wherein the audio and/or video channel is established as an audio channel wherein the at least one message is the SIP INFO message and wherein the SIP INFO message is used to change the established audio channel to a video channel.

18. The system of claim 5, wherein the transmitted SDP template purposely omits a video modifier communication attribute in order to not slow start the communication session.

19. The method of claim 12, wherein the transmitted SDP template purposely omits a video modifier communication attribute in order to not slow start the communication session.

* * * * *